US009753192B2

(12) United States Patent
Furukawa (10) Patent No.: US 9,753,192 B2
(45) Date of Patent: Sep. 5, 2017

(54) REFLECTOR, ADJUSTMENT METHOD, AND POSITION DETECTION APPARATUS

(71) Applicant: SEIKO EPSON CORPORATION, Tokyo (JP)

(72) Inventor: Tatsuya Furukawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 456 days.

(21) Appl. No.: 14/598,884

(22) Filed: Jan. 16, 2015

(65) Prior Publication Data

US 2015/0204659 A1     Jul. 23, 2015

(30) Foreign Application Priority Data

Jan. 21, 2014  (JP) ................................. 2014-008667
Mar. 27, 2014  (JP) ................................. 2014-066350

(51) Int. Cl.
   *G02B 5/09*     (2006.01)
   *G06F 3/041*    (2006.01)
   *G06F 3/042*    (2006.01)

(52) U.S. Cl.
   CPC .............. *G02B 5/09* (2013.01); *G06F 3/042* (2013.01); *G06F 3/0416* (2013.01); *G06F 3/0418* (2013.01); *G06F 3/0421* (2013.01); *G06F 3/0428* (2013.01)

(58) Field of Classification Search
   CPC ...... G06F 3/0421; G06F 3/0416; G03B 21/14
   See application file for complete search history.

(56) References Cited

U.S. PATENT DOCUMENTS

| 6,421,042 B1 * | 7/2002 | Omura .................... G06F 3/011 345/156 |
| 8,116,518 B2 | 2/2012 | Shamaie et al. |
| 2012/0249418 A1 * | 10/2012 | Onishi .................. G06F 3/0421 345/156 |
| 2015/0205377 A1 * | 7/2015 | Koyama ............... G06F 3/0325 345/156 |

FOREIGN PATENT DOCUMENTS

JP     5015270 B2    8/2012

\* cited by examiner

*Primary Examiner* — William C Dowling
(74) *Attorney, Agent, or Firm* — Oliff PLC (57) ABSTRACT

A reflector that is used for adjusting a radiation direction of a radiation unit in a position detection apparatus that performs a process based on a detected position of reflected light of light radiated from the radiation unit includes a first reflection surface that reflects the light radiated from the radiation unit, and a second reflection surface that intersects with the first reflection surface and reflects the light radiated from the radiation unit.

6 Claims, 7 Drawing Sheets

REFLECTOR, ADJUSTMENT METHOD, AND POSITION DETECTION APPARATUS

The entire disclosure of Japanese Patent Application Nos. 2014-008667, filed Jan. 21, 2014 and 2014-066350, filed Mar. 27, 2014 are expressly incorporated by reference herein.

BACKGROUND

1. Technical Field

The present invention relates to a reflector, an adjustment method, and a position detection apparatus.

2. Related Art

There is a known apparatus in which when an image is projected on a projection surface by a projection unit, the projection surface on which the image is projected is irradiated with light and light formed by reflection of the light from an indicator operated by a user is imaged to detect the position of the indicator (refer to Japanese Patent No. 5015270).

However, in the above-described apparatus, the radiation direction of the light with respect to the projection surface is not easily adjusted in some cases.

SUMMARY

An advantage of some aspects of the invention is to provide a reflector, an adjustment method, and a position detection apparatus capable of easily adjusting a radiation direction of light.

An aspect of the invention is directed to a reflector that is used for adjusting a radiation direction of a radiation unit in a position detection apparatus that performs a process based on a detected position of reflected light of light radiated from the radiation unit including a first reflection surface that reflects the light radiated from the radiation unit, and a second reflection surface that intersects with the first reflection surface and reflects the light radiated from the radiation unit.

With this configuration, since the reflector reflects the light radiated from the radiation unit from the first reflection surface and reflects the light radiated from the radiation unit from the second reflection surface that intersects with the first reflection surface, the radiation direction of the light radiated from the radiation unit can be easily adjusted.

In the aspect of the invention, in the reflector, the first reflection surface may be provided in a member that extends in a first direction, and the second reflection surface may be provided in a member that extends in a second direction different from the first direction and further may be formed in the member to be inclined from a side on which the first reflection surface intersects with the second reflection surface to the opposite side.

With this configuration, in the reflector, since the first reflection surface is provided in the member that extends in the first direction, and the second reflection surface is provided in the member that extends in the second direction different from the first direction and further is formed in the member that extends in the second direction so as to be inclined from the side on which the first reflection surface intersects with the second reflection surface to the opposite side, compared to a case in which inclination is not provided, the reflected light of the light radiated from the radiation unit can be detected in a wider region.

In the aspect of the invention, in the reflector, when the reflector is installed on a flat surface, the first direction may be a direction away from the flat surface, the second direction may be a direction substantially parallel to the flat surface, and the second reflection surface may be inclined such that the height from the flat surface is higher on the side on which the first reflection surface intersects with the second reflection surface than on the opposite side.

With this configuration, when the reflector is installed on the flat surface, the first direction is the direction away from the flat surface, the second direction is the direction substantially parallel to the flat surface, and the second reflection surface is inclined such that the height from the flat surface is higher on the side on which the first reflection surface intersects with the second reflection surface than on the opposite side, and thus, the light radiated from the radiation unit is prevented from being blocked, and further, compared to a case in which an inclination is not provided, the reflected light of the light radiated from the radiation unit can be detected in a wider region.

In the aspect of the invention, in the reflector, the height of the inclination of the second reflection surface may be greater than the width of the light radiated from the radiation unit in the height direction of the inclination.

With this configuration, in the reflector, since the height of the inclination of the second reflection surface is greater than the width of the light radiated from the radiation unit in the height direction of the inclination, the light radiated from the radiation unit can be moved to a region on the second reflection surface.

Another aspect of the invention is directed to an adjustment method that is used for adjusting a radiation direction of light from a radiation unit in a position detection apparatus that performs a process based on a detected position of reflected light formed by reflection of the light radiated from the radiation unit from a reflector, including using a reflector including a first reflection surface that reflects the light radiated from the radiation unit, and a second reflection surface that intersects with the first reflection surface and reflects the light radiated from the radiation unit as the reflector, detecting a position of light reflected from the reflector, and adjusting the radiation direction based on the detected position of the reflected light.

With this configuration, in the adjustment method, since the light reflected from the reflector is detected, and the radiation direction is adjusted based on the detected position of the reflected light, the radiation direction of the light radiated from the radiation unit can be easily adjusted.

Still another aspect of the invention is directed to a position detection apparatus including a detection unit that detects a position of light reflected from a reflector including a first reflection surface that reflects light radiated from a radiation unit, and a second reflection surface that intersects with the first reflection surface and reflects the light radiated from the radiation unit, a determination unit that determines whether the position of the reflected light detected by the detection unit is on the first reflection surface or the second reflection surface, and an output unit that outputs information according to the determination result from the determination unit.

With this configuration, since the position detection apparatus detects the position of the light reflected from the reflector, determines whether the detected position of the reflected light is on the first reflection surface or the second reflection surface, and outputs information according to the determination result, the position detection apparatus can notify a user of the radiation direction of a light curtain L using character information or voice information.

From the above, since the reflector reflects the light radiated from the radiation unit from the first reflection surface and reflects the light radiated from the radiation unit from the second reflection surface that intersects with the first reflection surface, the radiation direction of the light radiated from the radiation unit can be easily adjusted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
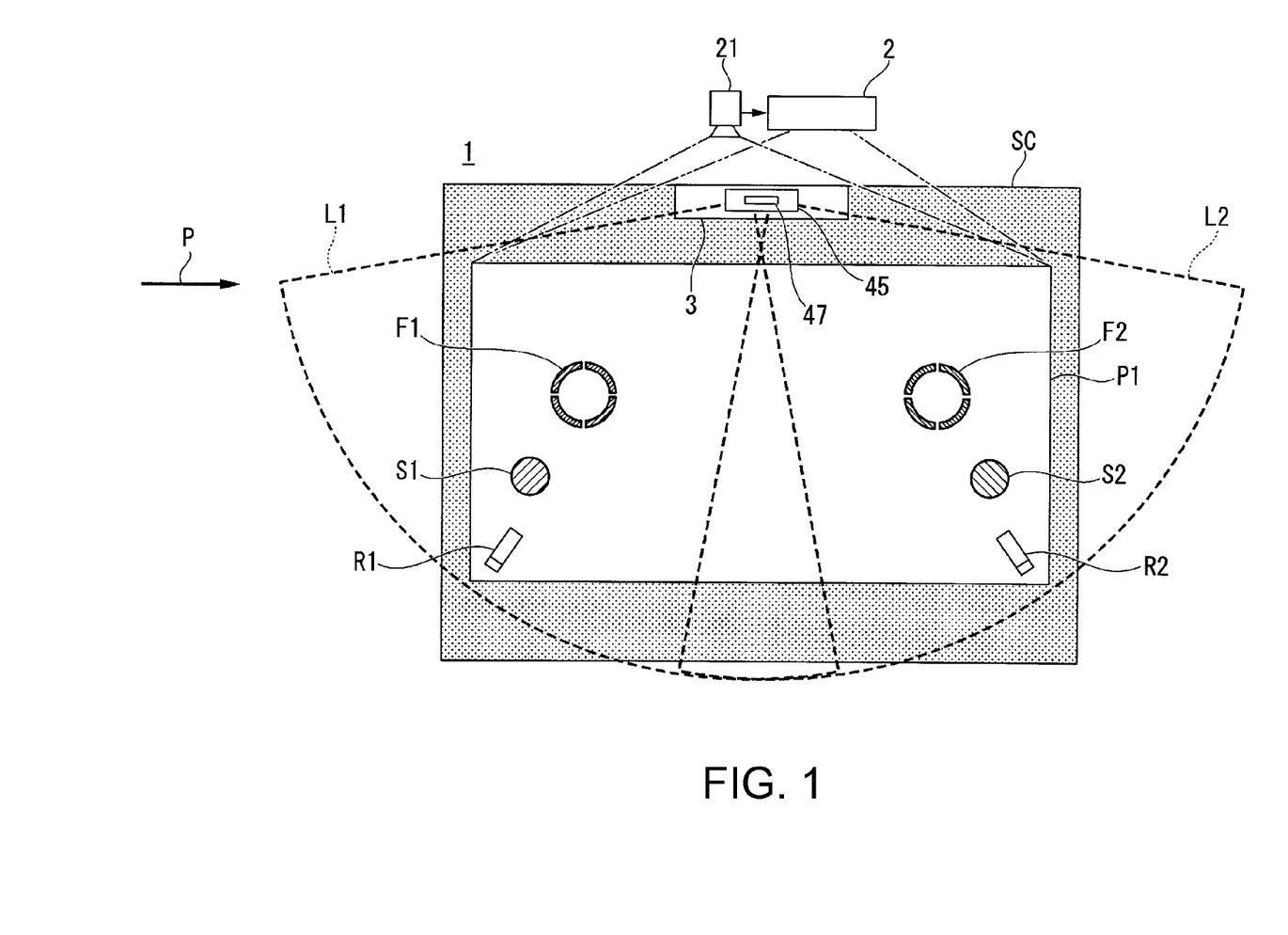
FIG. 1 is a view schematically showing an example of a state in which a position detection apparatus according to an embodiment is used.

Hereinafter, an embodiment of the invention will be described with reference to the drawings. FIG. 1 is a view schematically showing an example of a state in which a position detection apparatus 1 according to an embodiment is used. In the embodiment, the position detection apparatus 1 includes a projector 2, a light curtain generator 3, and an imaging unit 21. In FIG. 1, the projector 2, the light curtain generator 3, and the imaging unit 21 are respectively shown as separate components only for convenience, and the components may be replaced with integrated hardware of two or more thereof. In the embodiment, a configuration in which the projector 2 includes the imaging unit 21 therein will be described.

Figure 2:
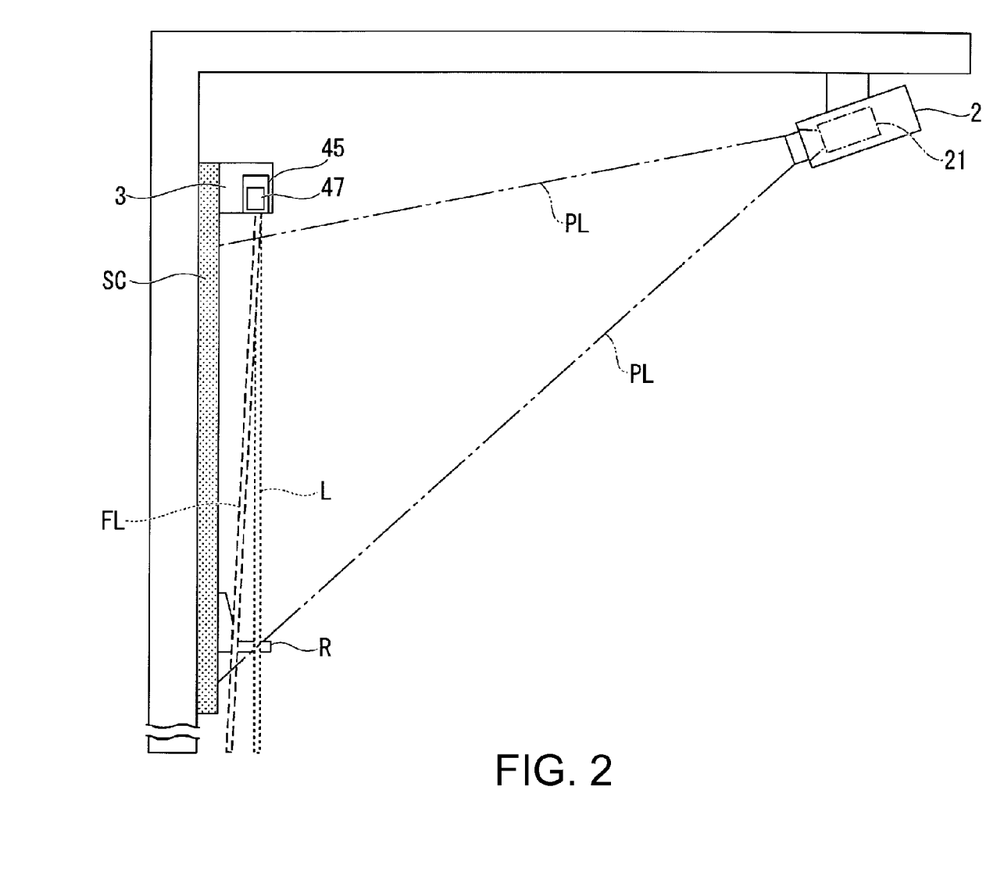
FIG. 2 is a side view showing a light curtain generator and a screen when viewed from the direction of an arrow shown in FIG. 1.

The imaging unit 21 is, for example, a camera including a charge coupled device (CCD), a complementary metal oxide semiconductor (CMOS), or the like, which is an imaging device that converts condensed light into an electric signal. In the embodiment, the imaging unit 21 is hardware combined with the projector 2 as shown in FIG. 2. The imaging unit 21 may be separately provided from the projector 2 and communicably connected to the projector 2 by wire or wirelessly instead of being integrated with the projector 2. Further, the imaging unit 21 is disposed at a position where the imaging unit can image reflected light formed by reflection of light in an infrared region (wavelength range), radiated from the light curtain generator 3.

The imaging unit 21 images a projection image P1 projected on a screen SC by the projector 2 in order to output the imaged projection image P1 to the projector 2. For example, an infrared light filter for selectively receiving light in the infrared region, radiated from the light curtain generator 3 as light curtains L1 and L2, is attached to the imaging unit 21. For example, a mechanism that can be detachably attached to a lens of the imaging unit 21 is attached to the infrared light filter.

Here, the light curtains L1 and L2 shown in FIG. 1 are, for example, light in an infrared region, radiated from the light curtain generator 3 to a planar region along the screen SC (substantially parallel with the screen SC). In the embodiment, when there is no need to distinguish between the light curtains L1 and L2, the light curtains are collectively referred to as a light curtain L. Further, the light curtain L may be light having other shapes instead of the light radiated to the planar region.

The projector 2 projects light of various images on the screen SC. The image according to the image light is projected on the screen SC as the projection image P1. As the screen SC, instead of an exclusive screen for displaying the projection image P1, a wall or a planar surface of an object such as the upper surface of a table may be used. On the screen SC, L-shaped reflectors R1 and R2 are installed at predetermined positions. The reflectors R1 and R2 are installed by a user when the angle of the light curtain is adjusted. In the following description, when there is no need to distinguish between the reflectors R1 and R2, the reflectors are collectively referred to as a reflector R. The reflector R is formed by using a material that reflects the light in the infrared region, radiated by the light curtain generator 3, and for example, is formed of plastic or the like. In addition, the reflector R can be detachably attached to the screen SC by a magnet, a sucker, a double-sided adhesive tape, or the like, but may be supported by a hand of a human or the like. Further, the reflector R may have another shape in which a first reflection surface and a second reflection surface intersect, which are two reflection surfaces, instead of the L shape.

In the embodiment, the projector 2 has two functional modes of a normal use mode and a light curtain angle adjustment mode. The mode of the projector 2 can be switched to either of these two modes by the operation of the user. In the normal use mode, the projector 2 acquires the imaged image from the imaging unit 21 and detects the position of the reflected light on the acquired imaged image. The reflected light is light obtained such that the light curtains L1 and L2 which are light in an infrared region, radiated by the light curtain generator 3 are reflected from an indicator. Here, the indicator is a finger of a user, a stick, a pen, or the like and is a type of reflector which reflects the light curtain L. In the embodiment, for convenience, the reflector in the normal use mode is referred to as the indicator. The projector 2 calculates a position indicated by the user with the indicator based on the detected position of the reflected light (for example, the position on the projection image P1). Then, the projector 2 projects a mark such as a cursor onto the calculated position. Accordingly, the mark is displayed at the position indicated by the user with the indicator.

In addition, in the light curtain angle adjustment mode, the projector 2 acquires the imaged image from the imaging unit 21 and detects the positions of the reflected light from the reflectors R1 and R2 in the acquired imaged image. The angle of the light curtain is an example of the radiation direction of the light by the radiation unit. Thus far, the same manner as in the normal use mode is applied. The projector 2 projects predetermined marks (for example, a marker S1 and a marker S2 in FIG. 1) onto positions corresponding to the detected positions on the screen SC based on the detected positions of the reflected light. As the mark, in the embodiment, a mark different from the cursor projected in the normal use mode is used, but these marks may be the same.

When the angle of the light curtain L is automatically adjusted as in the embodiment, the projector 2 may not project the mark. In addition, when the angle of the light curtain L is manually adjusted, the projector 2 preferably projects this mark so that the user can intuitively adjust the angle of the light curtain L. When the angle of the light curtain L is manually adjusted, the projector 2 displays a present position marker S1 indicating a present angle direction of the light curtain L1 and a present position marker S2 indicating a present angle direction of the light curtain L2. Further, as shown in FIG. 1, the projector 2 displays a target position marker F1 which is a movement destination (target) of the present position marker S1 moving according to the adjustment when the angle direction of the light curtain L1 is adjusted to a desired angle direction. In the same manner, the projector 2 displays a target position marker F2 which is a movement destination (target) of the present position marker S2 moving according to the adjustment when the angle direction of the light curtain L2 is adjusted to a desired angle direction.

When the user adjusts the angle direction of the light curtain L1 so as to superimpose the present position marker S1 on the target position marker F1, the radiation direction of the light curtain L1 can be directed in a desired direction. Further, when the user adjusts the angle direction of the light curtain L2 so as to superimpose the present position marker S2 on the target position marker F2, the radiation direction of the light curtain L2 can be directed in a desired direction. The projector 2 may project a mark indicating a predetermined position for the reflectors R1 and R2 to be installed on the screen SC to present the position to the user when the light curtain angle adjustment mode is set.

The light curtain generator 3 includes a light emitting unit 45, and an angle adjustment unit 47. The light curtain generator 3 is, for example, installed above the screen SC as shown in FIG. 2 and radiates the light curtains L1 and L2 to two fan-shaped flat regions that cover the screen SC shown in FIG. 1. Further, the light curtain generator 3 is an example of the radiation unit.

The wavelength range of the light curtain L is, for example, a wavelength range including infrared light (for example, infrared region including a wavelength of about 940 nanometers). However, instead of the above wavelength range, the wavelength range may be another wavelength range such as visible light. The light curtain generator 3 may be installed below the screen SC, at the left end or the right end of the screen SC, or the like, instead of being installed above the screen SC.

The light emitting unit 45 radiates planar light as the light curtain L. The light emitting unit 45 is, for example, a light emitting diode (LED) or a laser diode (LD) to which an optical system member such as a light emitter such as a collimator lens, or a Powell lens, is attached. In addition, a member including a mechanism that changes the radiation directions of the light curtains L1 and L2 radiated from the light emitter using the angle adjustment unit 47 is attached to the light emitting unit 45.

The angle adjustment unit 47 acquires information indicating the angle of the light curtain L from the projector 2 and changes the radiation direction of the light curtain L radiated from the light emitting unit 45 based on the acquired information indicating the angle of the light curtain L. In the embodiment, for example, the light emitting unit 45 radiates the light curtain L1 and the light curtain L2 respectively using light from different light sources (such as the aforementioned LED). However, instead of using different light sources, the light emitting unit may radiate light from one light source or from three or more light sources.

Here, a state in which the radiation direction of the light curtain L is changed with the angle adjustment unit 47 will be described with reference to FIG. 2. FIG. 2 is a side view showing the light curtain generator 3 and the screen SC when viewed from the direction of the arrow P shown in FIG. 1. As shown in FIG. 2, for example, the projector 2 is installed on the ceiling and displays the projection image P1 on the screen SC by projecting projection light PL. Further, the projector 2 may be installed on, for example, a table, a wall or the like, instead of the ceiling.

In addition, the light curtain generator 3 is installed at the upper end of the screen SC. The light emitting unit 45 of the light curtain generator 3 radiates the light curtain L in, for example, the radiation direction indicated by the dotted line in FIG. 2 along the screen SC. For example, the angle adjustment unit 47 changes the radiation direction of the light curtain L from the light emitting unit 45 to the direction of a region FL indicated by the broken line in FIG. 2.

Figure 3:
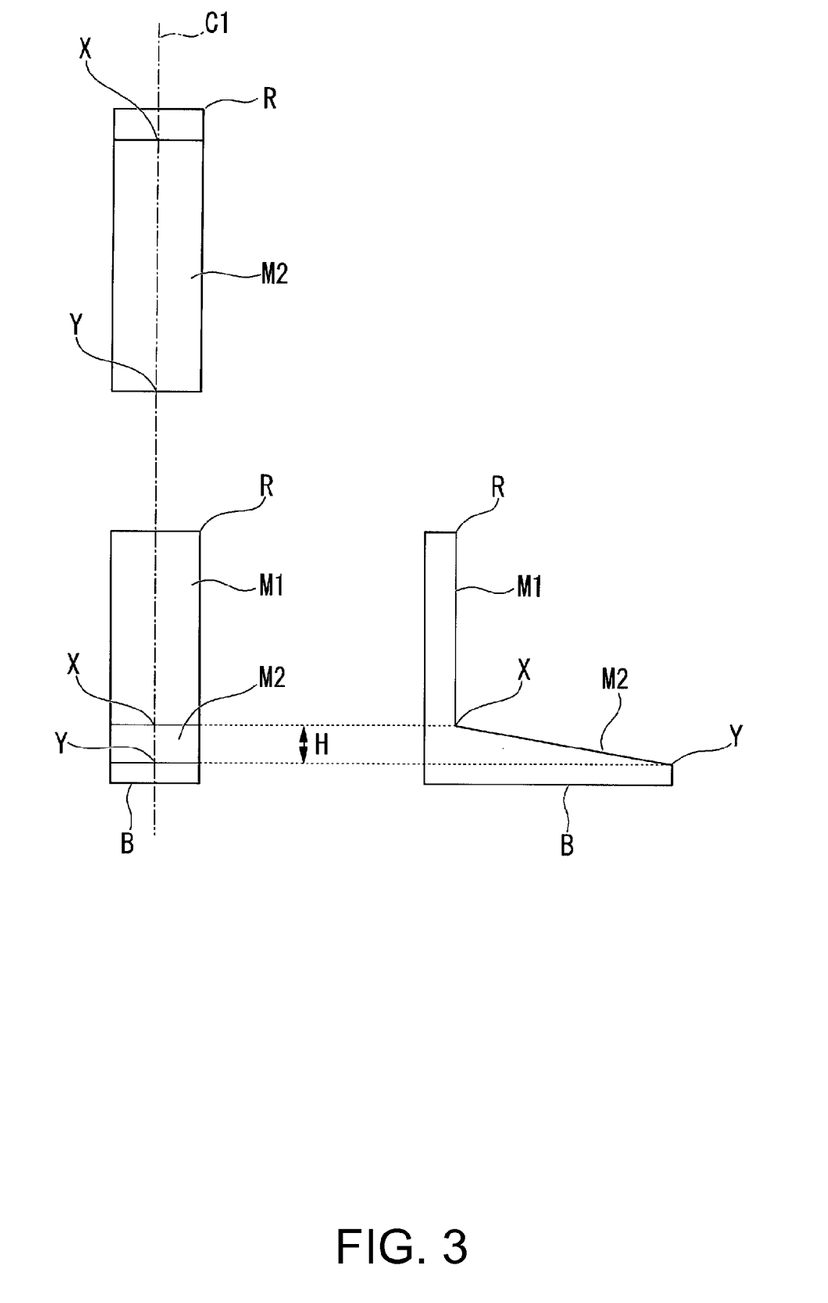
FIG. 3 is a view showing an example of three-orthographic views of an L-shaped reflector installed on the screen.
Figure 4:
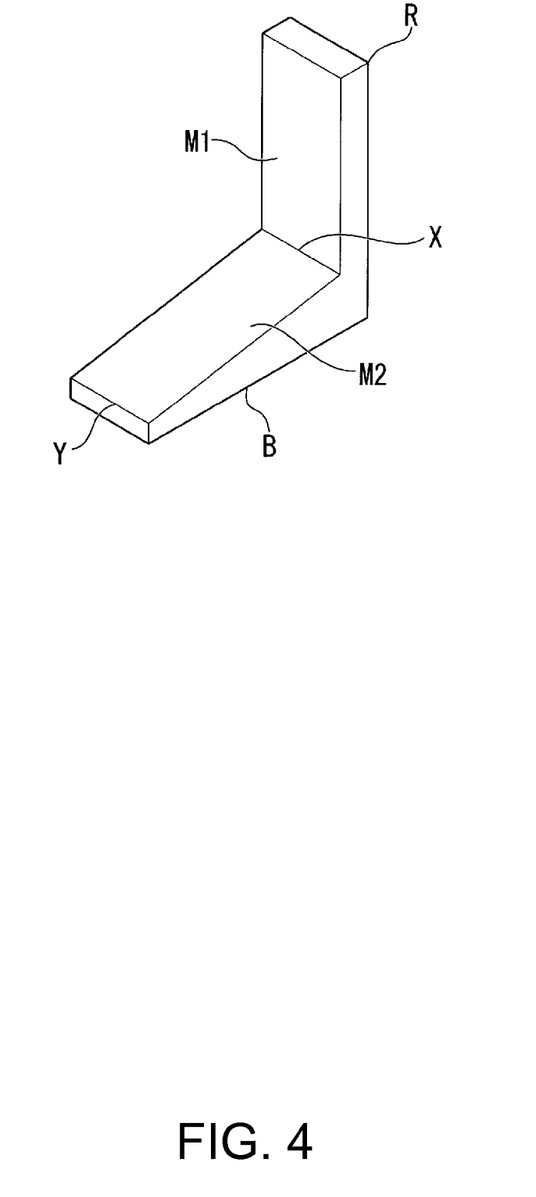
FIG. 4 is a view showing an example of a perspective view of the L-shaped reflector.

Next, the L-shaped reflector R installed on the screen SC will be described with reference to FIGS. 3 and 4. FIG. 3 is a view showing an example of three-orthographic views of the L-shaped reflector R installed on the screen SC. FIG. 4 is a view showing an example of a perspective view of the L-shaped reflector R. As shown in FIGS. 3 and 4, the L-shaped reflector R has a first reflection surface M1 that is provided in a first member that extends in the direction of a center line C1 (first direction) and a second reflection surface M2 that is provided on a surface opposite to a bottom surface B of a second member that extends in a direction substantially orthogonal to the center line C1 (second direction). The reflector R is installed on the screen SC so that the bottom surface B of the second member is brought into contact with the screen SC and the tip end of the second member is directed toward the light emitting unit 45 of the light curtain generator 3. At this time, the first member protrudes substantially vertically from the screen SC and the first reflection surface M1 is opposite to the light emitting unit 45.

The second reflection surface M2 is inclined to the second direction from an end point X of the second reflection surface on the side in which the first direction intersects with the second direction to an end point Y on the opposite side. More specifically, the second reflection surface M2 is inclined as being separated from the end point X to the endpoint Y so that the height from the bottom surface B to the end point X in the second member is the highest and the height from the bottom surface B to the end point Y in the second member is the lowest.

In the L-shaped reflector R, the first reflection surface M1 may be inclined instead of the second reflection surface M2 being inclined and both the first reflection surface M1 and the second reflection surface M2 may be inclined. Further, both the first reflection surface M1 and the second reflection surface M2 may not be inclined. In addition, the first direction and the second direction may be different directions from each other having different angles instead of being substantially orthogonal to each other. Since the reflector R also has the second reflection surface M2 as well as the first reflection surface M1 as described above, the position detection apparatus 1 can detect the radiation direction of the light curtain L which is not detectable with a reflector having only one reflection surface, for example.

In the embodiment, the height H of the inclined surface in the front view shown in FIG. 3 has a greater value than the laser diameter of the light curtain L (for example, 3 millimeters) (for example, about 4 millimeters) but may be smaller than the laser diameter of the light curtain L as another configuration example. When the height H of the inclined surface in the front view shown in FIG. 3 has a greater value than the laser diameter of the light curtain L, the reflector R can prevent the laser beam of the light curtain L from being blocked due to the angle of the second member without being moved in the region on the second reflection surface M2.

Figure 5:
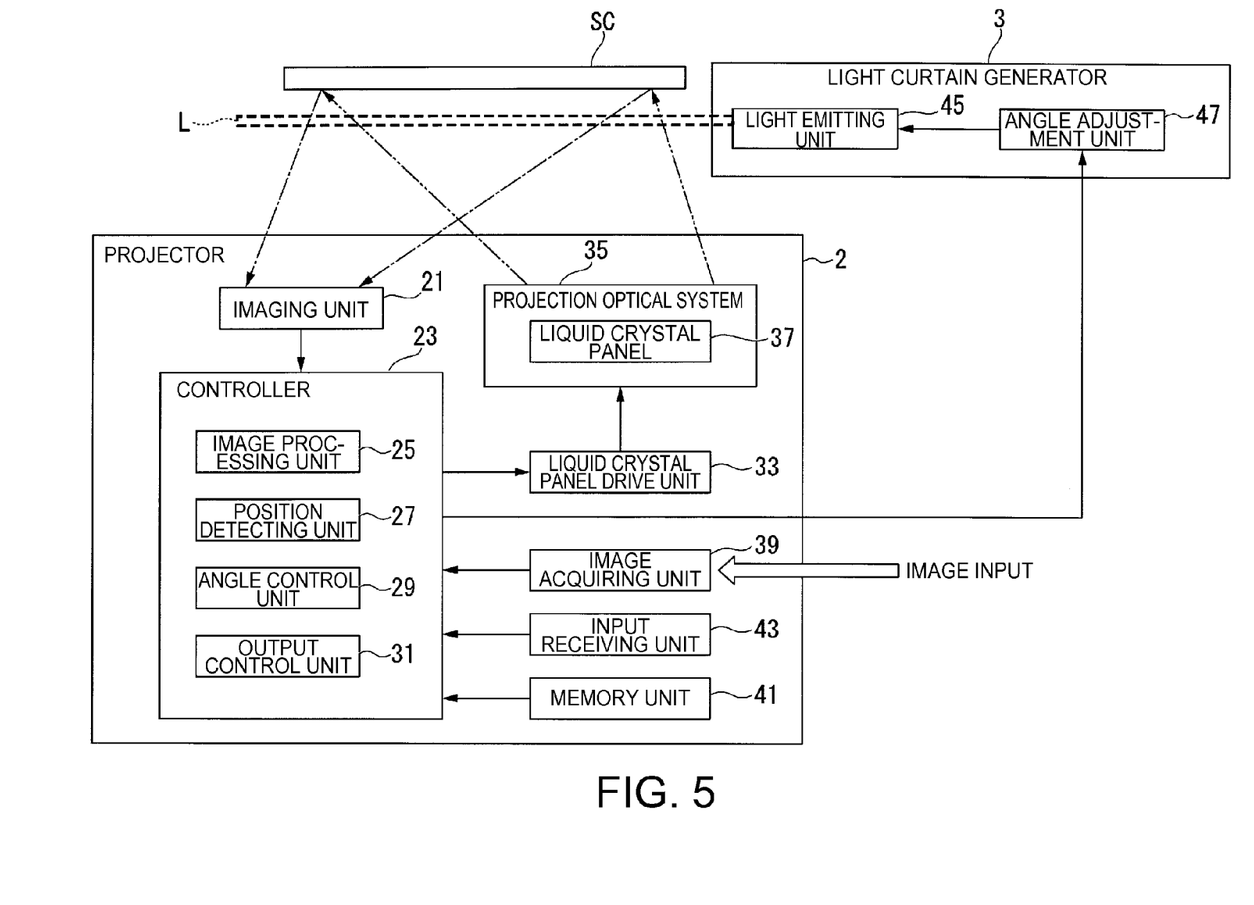
FIG. 5 is a view showing an example of the functional configuration of a projector and the light curtain generator provided in the position detection apparatus.

Next, the functional configuration of the projector 2 and the light curtain generator 3 provided in the position detection apparatus 1 will be described with reference to FIG. 5. FIG. 5 is a view showing an example of the functional configuration of the projector 2 and the light curtain generator 3 provided in the position detection apparatus 1. The projector 2 includes a controller 23, a liquid crystal panel drive unit 33, a projection optical system 35 including liquid crystal panels 37, an image acquiring unit 39, a memory unit 41, and an input receiving unit 43, as well as the imaging unit 21.

The controller 23 includes an image processing unit 25, a position detecting unit 27, an angle control unit 29, and an output control unit 31. In the embodiment, a part of or all of the functional components provided in the controller 23 are configured by using a field-programmable gate array (FPGA) (not shown), but instead of the above configuration, a central processing unit (CPU) (not shown) may read various programs stored by the memory unit 41 and perform the read programs. The controller 23 controls the mode of the projector 2 to be switched to either of the normal use mode and the light curtain angle adjustment mode through the operation from the user received by the input receiving unit 43.

The image processing unit 25 converts an image signal acquired from the image acquiring unit 39 into image information indicating the gradations of each of the pixels in the liquid crystal panels 37 provided in the projection optical system 35 for each of RGB (red, green, blue). In addition, when the projector 2 is in the normal use mode, the image processing unit 25 superimposes the information of a mark such as a cursor on the image information to be displayed such that the mark is displayed at the position corresponding to the position of the indicator detected by the position detecting unit 27.

Further, when the projector 2 is in the angle adjustment mode of the light curtain L, the image processing unit 25 may display the present position markers S1 and S2 indicating the present angle direction of the light curtain L and the target position markers F1 and F2 which are destinations of the present position markers S1 and S2 moving when the directions of the light curtains L1 and L2 are adjusted to desired angle directions to be superimposed on the image information based on the position of the reflected light from the reflector R detected by the position detecting unit 27. In addition, the image processing unit 25 displays various character information (for example, a message or the like) or images on the projection image P1 according to a request from the output control unit 31.

The position detecting unit 27 detects the position (detection position) of the reflected light from the indicator or the reflector R on the imaged image based on the imaged image in which the reflected light of the light curtain L from the indicator or the reflector R is imaged. When the angle control unit 29 determines the radiation direction of the light curtain L based on the detection position and determines that the radiation direction of the light curtain L is not a desired direction, the angle control unit 29 outputs information indicating the angle of the light curtain L to the light curtain generator 3 and adjusts the angle of the light curtain L to a desired radiation direction.

The output control unit 31 controls the image processing unit 25 to display character information or an image including information indicating the radiation direction of the light curtain L determined by the position detecting unit 27 on the projection image P1. Further, the output control unit 31 may output a voice, an electronic sound, or the like including information indicating the radiation direction of the light curtain L determined by the position detecting unit 27, instead of controlling the image processing unit 25 to display the character information or an image on the projection image P1. In this case, the projector 2 includes hardware that outputs voice such as a speaker.

The image acquiring unit 39 acquires an image signal from the outside through an image input terminal or the like and outputs the acquired image signal to the controller 23. The liquid crystal panel drive unit 33 applies (drives) driving voltage to each of the pixels in the liquid crystal panels 37 provided in the projection optical system 35 according to the image information input from the image processing unit 25 in the controller 23. By applying the voltage, the liquid crystal panel drive unit 33 allows light incident on the liquid crystal panels 37 from the light source (not shown) provided in the projection optical system 35 to be formed on the liquid crystal panels 37 as light for projecting an image according to image information.

The projection optical system 35 includes a reflector that reflects light emitted from the light source toward the liquid crystal panels 37 and allows the reflected light to be formed on the liquid crystal panels 37 as light for projecting an image according to image information. Then, the projection optical system 35 projects the light formed on the liquid crystal panels 37 for projecting an image on the screen SC through a projection lens (not shown). Further, the light source is, for example, a discharge type light source lamp constituted by extra-high pressure mercury lamp, metal halide lamp or the like but is not limited to the above-described light source lamp. A light emitting diode (LED) light source or a laser light source may be used.

The liquid crystal panels 37 are, for example, transmission type liquid crystal panels having a pair of transparent substrates between which liquid crystals are sealed and respectively corresponding to RGB which are primary colors of light. The liquid crystal panel 37 is not limited to the transmission type liquid crystal panel and may be a reflection type liquid crystal panel. In addition, instead of the liquid crystal panel 37, a digital mirror device (DMD) or the like may be used.

The memory unit 41 includes, for example, a random access memory (RAM), a register, a hard disk drive (HDD), a solid state drive (SSD), and the like. The memory unit 41 stores various information and programs processed by the projector 2.

The input receiving unit 43 is, for example, various operating buttons, operating keys, touch panels, and the like, which receive an instruction or the like from the user. Further, the input receiving unit 43 is not limited to being provided (built) in the projector 2 and may be a remote controller that includes various operating buttons, operating keys, touch panels, and the like, which receive an input from the user, and transmits information indicating the input received from the user by wire or wirelessly, or the like. In this case, the projector 2 includes a receiving unit that receives the information transmitted from the remote controller.

Figure 6A:
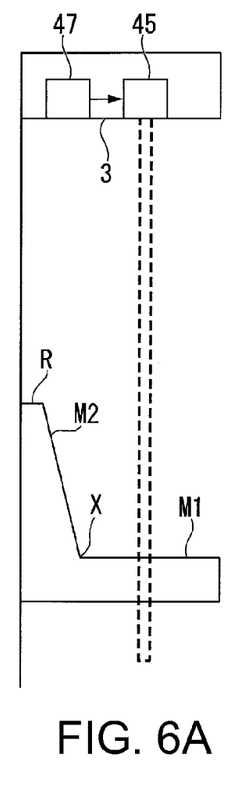
FIGS. 6A to 6E are views illustrating a state in which the radiation direction of a light curtain is changed with a controller.
Figure 6B:
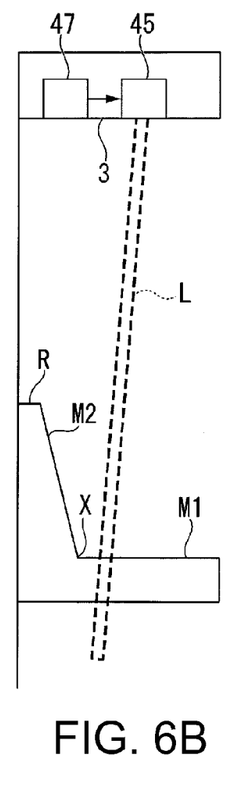
Figure 6C:
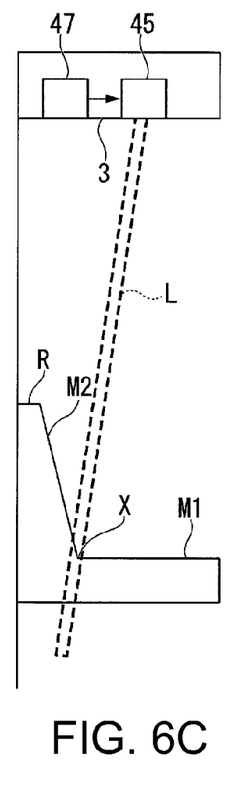
Figure 6D:
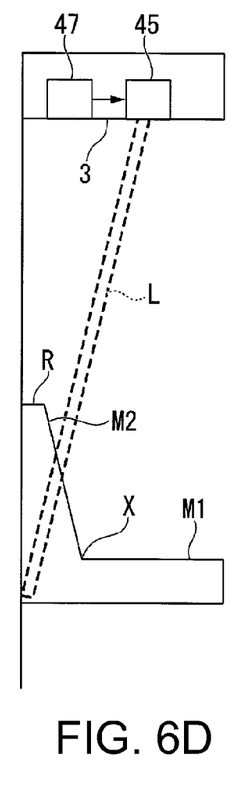
Figure 6E:
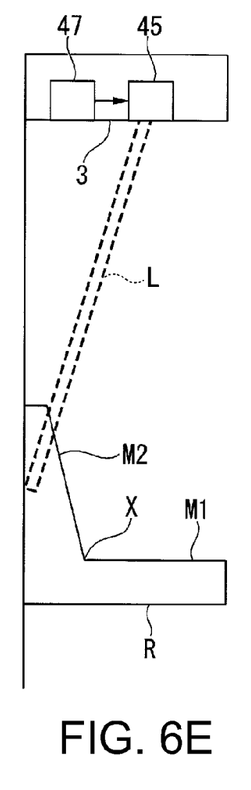

Next, the adjustment of the radiation direction of the light curtain L with the controller 23 will be described with reference to FIGS. 6A to 6E. FIGS. 6A to 6E are views illustrating a state in which the radiation direction of the light curtain L is changed with the controller 23. In the following description, a direction from the light emitting unit 45 to the end point X at which the first reflection surface M1 and the second reflection surface M2 of the reflector R intersect with each other is described as a desired direction of the light curtain L. FIG. 6C shows a case in which the radiation direction of the light curtain L is a desired direction. FIG. 6A shows a case in which the radiation direction of the light curtain L is toward the first reflection surface M1. FIG. 6B shows one situation in the process from FIG. 6A to FIG. 6C. In contrast, FIG. 6E shows a case in which the radiation direction of the light curtain L is toward the second reflection surface M2. FIG. 6D shows one situation in the process from FIG. 6E to FIG. 6C.

In the situation shown in FIGS. 6A and 6B, the angle control unit 29 determines that the light curtain L from the light emitting unit 45 is radiated not in a desired direction but to the position on the first reflection surface M1 separated from the end point X on the opposite side of the screen SC. Then, the output control unit 31 outputs character information or an image including information indicating the determination result. In the same manner, in the situation shown in FIGS. 6D and 6E, the angle control unit 29 determines that the light curtain L from the light emitting unit 45 is radiated not in a desired direction but to the position on the second reflection surface M2 separated from the end point X to the light emitting unit 45. Then, the output control unit outputs character information or an image including information indicating the determination result.

In this manner, since the reflector R has the second reflection surface M2 provided in the second member that extends in the second direction as well as the first reflection surface M1 provided in the first member that extends in the first direction in the position detection apparatus 1, as shown in FIG. 6E, the reflected light of the light curtain L radiated in the radiation direction in which the light cannot be reflected with only the first reflection surface M1 can be detected. Here, for comparison, in FIGS. 7A to 7E, a state in which the radiation direction of the light curtain L is changed with the controller 23 when a cylindrical reflector CR is installed on the screen SC is illustrated. FIGS. 7A to 7E illustrate a state in which the radiation direction of the light curtain L is changed with the controller 23 when the cylindrical reflector CR is installed on the screen SC.

Figure 7A:
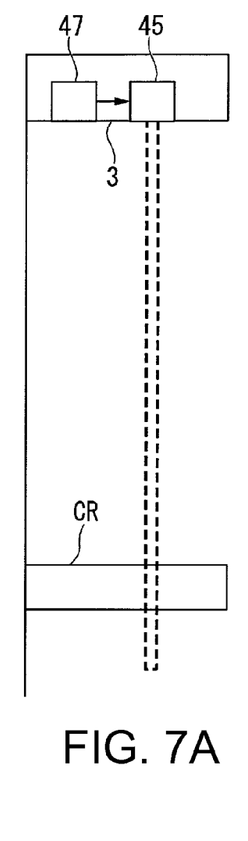
FIGS. 7A to 7E are views illustrating a state in which the radiation direction of the light curtain is changed with the controller when a cylindrical reflector is installed on the screen.
Figure 7B:
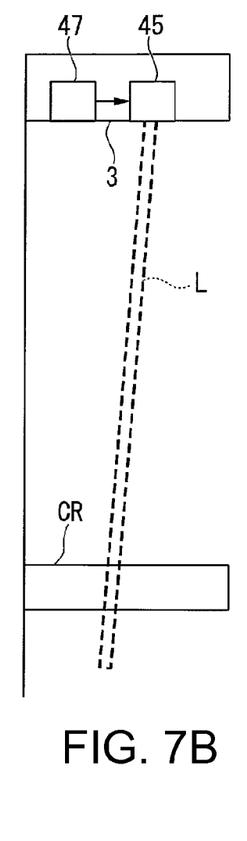
Figure 7C:
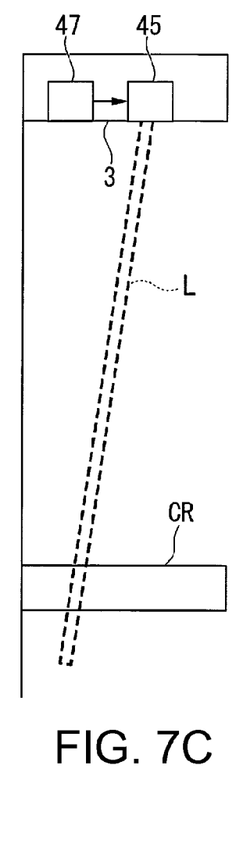
Figure 7D:
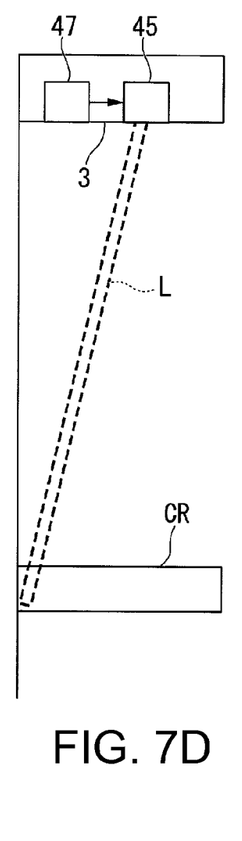
Figure 7E:
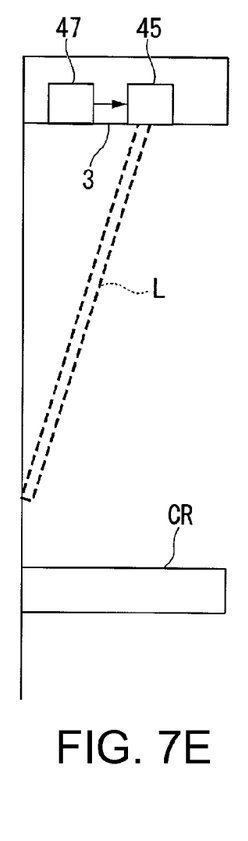

FIG. 7C shows a case in which the radiation direction of the light curtain L is a desired direction. FIG. 7A shows a case in which the radiation direction of the light curtain L is toward the reflection surface of the reflector CR. FIG. 7B shows one situation in the process from FIG. 7A to FIG. 7C. In contrast, FIG. 7E shows a case in which the radiation direction of the light curtain L is a direction toward the upper position of the installation position at which the reflector CR is installed on the screen SC. FIG. 7D shows one situation in the process from FIG. 7E to FIG. 7C.

In FIGS. 7A, 7B, and 7C, the position detection apparatus 1 can detect the position of the reflected light of the light curtain L from the reflector CR in the same manner as in FIGS. 6A, 6B, and 6C. However, in the case illustrated in FIG. 7D, since the light curtain L is radiated to the vicinity of the installation point at which the reflector CR is installed on the screen SC, the position detection apparatus 1 cannot detect the reflected light of the light curtain L from the reflector CR in some cases due to an influence such as an error. Further, in the case illustrated in FIG. 7E, since the light curtain L is radiated not onto the reflector CR but to the position on the screen SC, the position detection apparatus 1 cannot detect the reflected light of the light curtain L from the reflector CR.

As described above, since the reflector R according to the embodiment reflects the light curtain L radiated from the light curtain generator 3 from the first reflection surface M1 and reflects the light curtain L radiated from the light curtain generator 3 from the second reflection surface M2 that intersects with the first reflection surface M1, the radiation direction of the light curtain L can be easily adjusted.

In addition, since the first reflection surface M1 is provided in the member that extends in the first direction, and the second reflection surface M2 is provided in the member that extends in the second direction which is different from the first direction and further is formed in the member that extends in the second direction so as to be inclined in the second direction from a side on which the first reflection surface M1 intersects with the second reflection surface M2 to the opposite side in the reflector R, compared to a case in which inclination is not provided, the reflected light of the light curtain L can be detected in a wider region.

In the reflector R, when the reflector is installed on the flat surface, the first direction is a direction away from the flat surface, the second direction is a direction substantially parallel to the flat surface, and the second reflection surface M2 is inclined such that the height from the flat surface is higher on the side on which the first reflection surface M1 intersects with the second reflection surface M2 than on the opposite side, and thus, the light curtain L is prevented from being blocked by the second member in which the second reflection surface M2 is provided, and further, compared to a case in which inclination is not provided, the reflected light of the light curtain L can be detected in a wider region.

Since the height of the inclination of the second reflection surface M2 is greater than the width of the light radiated from the radiation unit in the height direction of the inclination in the reflector R, the light curtain L can be prevented from being blocked due to the angle of the second member without being moved in the region on the second reflection surface M2.

Since the position detection apparatus 1 according to the embodiment detects the position of the reflected light reflected from the reflector R, determines whether the position of the detected reflected light is on the first reflection surface M1 or the second reflection surface M2, and outputs information according to the determination result, the position detection apparatus can notify a user of the radiation direction of the light curtain L using character information or voice information.

Modification Examples of Above Embodiment

In the description of the above embodiments, the user performs an indication operation with the indicator placed on the screen SC (projection surface, display surface) onto which the front projection type projector 2 projects (displays) an image. However, the user may perform an indication operation on a display screen (display surface) on which a display device (display unit) other than the projector 2 displays an image. Even in this case, the light curtain generator 3 or the imaging unit 21 may be integrated with a display device or may be provided separately from the display device. As the display device other than the projector 2, a rear projection (rear surface projection) type projector, a liquid crystal display, an organic electro luminescence (EL) display, a plasma display, a cathode ray tube (CRT) display, a surface-conduction electron-emitter display (SED), or the like can be used.

In addition, a program for realizing the function of an arbitrary component in the above-described apparatus (for example, position detection apparatus 1) may be executed by recording the program on a computer-readable recording medium and causing a computer system to read the program. The "computer system" here includes operating software (OS) and hardware including peripherals. The "computer-readable recording medium" refers to transportable medium such as a flexible disk, an optical-magnetic disk, a read-only memory (ROM), or a compact disc-read-only memory (CD-ROM), or a storage device included in a computer system, such as a hard disk. Further, the "computer-readable recording medium" may be a medium that retains a program in a predetermined period of time, such as a volatile memory (random-access memory (RAM)) in a computer system that serves as a server or a client when a program is transmitted through a network such as the Internet or through a communication line such as a telephone line.

The above-described program may be transmitted from a computer system whose storage device or the like stores this program, to another computer system through a transmission medium or using transmission waves in the transmission medium. The "transmission medium" for transmitting the program refers to a medium having a function of transmitting information as a network (communication network) such as the Internet or a communication line (communication network) such as a telephone line.

Also, the above-described program may be a program for realizing a part of the above-described functions. Further, the above-described program may be a program that realizes the above-described functions by being combined with a program previously recorded in a computer system, that is, may be a differential file (difference program).

What is claimed is:

1. A reflector that is used for adjusting a radiation direction of a radiation unit in a position detection apparatus that performs a process based on a detected position of reflected light of light radiated from the radiation unit, the reflector comprising:
a first reflection surface that reflects the light radiated from the radiation unit; and
a second reflection surface that intersects with the first reflection surface and reflects the light radiated from the radiation unit.

2. The reflector according to claim 1,
wherein the first reflection surface is provided in a member that extends in a first direction, and
the second reflection surface is provided in a member that extends in a second direction which is different from the first direction and further is formed in the member that extends in the second direction so as to be inclined from a side on which the first reflection surface intersects with the second reflection surface to the opposite side.

3. The reflector according to claim 2,
wherein when the reflector is installed on a flat surface, the first direction is a direction away from the flat surface,
the second direction is a direction substantially parallel to the flat surface, and
the second reflection surface is inclined such that the height from the flat surface is higher on the side on which the first reflection surface intersects with the second reflection surface than on the opposite side.

4. The reflector according to claim 3,
wherein the height of the inclination of the second reflection surface is greater than the width of the light radiated from the radiation unit in the height direction of the inclination.

5. An adjustment method that is used for adjusting a radiation direction of light from a radiation unit in a position detection apparatus that performs a process based on a detected position of reflected light formed by reflection of the light radiated from the radiation unit from a reflector, the method comprising:
using a reflector including a first reflection surface that reflects the light radiated from the radiation unit, and a second reflection surface that intersects with the first reflection surface and reflects the light radiated from the radiation unit as the reflector;
detecting a position of light reflected from the reflector; and
adjusting the radiation direction based on the detected position of the reflected light.

6. A position detection apparatus comprising:
a detection unit that detects a position of light reflected from a reflector including a first reflection surface that reflects light radiated from a radiation unit, and a second reflection surface that intersects with the first reflection surface and reflects the light radiated from the radiation unit;
a determination unit that determines whether the position of the reflected light detected by the detection unit is on the first reflection surface or the second reflection surface; and
an output unit that outputs information according to the determination result from the determination unit.

* * * * *